United States Patent Office 3,264,318
Patented August 2, 1966

3,264,318
PROCESS FOR THE PRODUCTION OF
SUBSTITUTED OXADIAZOLES
Fernand Eloy, Rhode-Saint-Genese, Belgium, assignor to Union Carbide Corporation, a corporation of New York
No Drawing. Filed Apr. 29, 1964, Ser. No. 363,622
5 Claims. (Cl. 260—307)

This invention relates to the preparation of oxadiazoles. More specifically, this invention relates to the preparation of 3,5 - disubstituted - 1,2,4 - oxadiazoles, including those having a trichloromethyl substituent in the 5 position.

Disubstituted-1,2,4-oxadiazoles are useful as nematocides, insecticides, miticides, bactericides, fungicides, defoliants, and the like. Exceptionally well suited for use as nematocides are the halogenated 3,5-disubstituted-1,2,4-oxadiazoles such as, for example, 3-phenyl-5-trichloromethyl-1,2,4-oxadiazole and 3-methyl-5-trichloromethyl-1,2,4-oxadiazole. Furthermore, 3,5 - disubstituted-1,2,4-oxadiazoles having a trichloromethyl, para-nitrophenyl or nitrofuryl substituent in the 5-position of the oxadiazole nucleus may be utilized as intermediates for the synthesis of pharmaceuticals, high polymers, and also water-insoluble dyes, since these substituents, particularly the trichloromethyl group, can be easily converted into hydroxyl, amino, hydrazino, and other functional groups thus leading to oxadiazole derivatives having specific applicability.

These compounds have heretofore been prepared by a two-step process involving the acylation of an amidoxime followed by cyclization, usually carried out at elevated temperatures. In addition to the obvious drawbacks of a two-step synthesis such prior process meets with difficulties in that acyl chlorides used in acylation are difficult to handle and also in the preparation of amidoxime starting material which involves hydroxylamine, a hazardous material. Furthermore, the cyclization does not always proceed readily, and in some instances the synthesis terminates at the acylamidoxime stage. In addition, cyclization is sometimes achieved only at temperatures where the starting materials decompose or, if carried out at lower temperatures, requires an impractically long reaction time, e.g., four days. Generally, the yields of prior art processes, even under optimum conditions, are less than 80 percent.

The present invention obviates the difficulties inherent in known syntheses by providing a method of preparing 3,5-disubstituted-1,2,4-oxadiazoles which is a one-step reaction carried out at relatively low temperatures and utilizing readily available and easily handled starting materials. In addition, yields of 85 percent or greater, and often nearly quantitative yields are obtained by the present process and the time required for reaction is much less than in conventional syntheses.

The process of this invention comprises simultaneously contacting a certain class of nitriles with a primary nitro compound, an organic isocyanate and a tertiary amine catalyst at a temperature ofr rom 0° C. to 150° C. for a period of time sufficient to produce a 3,5-disubstituted-1,2,4-oxadiazole.

The reaction that takes place can be depicted by the following equation:

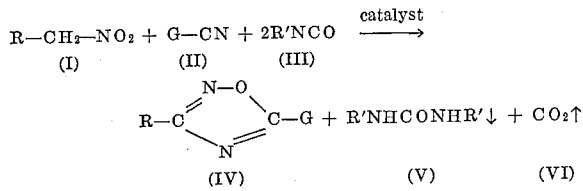

In carrying out the process, the nitro compound, nitrile and isocyanate are mixed, preferably in a solvent, and a tertiary amine catalyst is added. The urea derivative formed in the reaction precipitates and is filtered off. Evaporation of the remaining liquid, principally solvent, gives the substantially pure 3,5-disubstituted-1,2,4-oxadiazole.

In the above equation, R and R' are organic groups defined in more detail hereinbelow, and G is a trichloromethyl, p-nitrophenyl or 5-nitro-2-furyl group.

While considerable variation is possible with respect to substitution in the primary nitro compound (I) and in the organic isocyanate (III), the use of trichloroacetonitrile, p-nitrobenzo-nitrile or 5-nitro-2-furo-nitrile is necessary to obtain yields of 3,5-disubstituted-1,2,4-oxadiazoles of 85 percent or better by the one step process of this invention. Thus, as may be seen from the illustrative examples hereinbelow, the following table illustrates the effect of replacement of trichloroacetonitrile of this invention with other nitriles not of this invention on the yield of oxadiazole obtained, under substantially identical reaction conditions.

| Starting nitrile: | Oxadiazole yield, percent |
|---|---|
| $CCl_3CN$ | 91 |
| $CH_3CN$ | Trace |
| $CH_2ClCN$ | 40 |
| $C_6H_5CN$ | 10 |

With reference to the primary nitro compound (I) in the above equation, R represents a monovalent hydrocarbon group free of aliphatic unsaturation, including alkyl, aryl, aralkyl, alkaryl, and cycloalkyl groups, for example, methyl, tertiary-butyl, 2-ethylhexyl, octadecyl, phenyl, phenylethyl, mesityl, cumyl, diphenyl, cyclopentyl, and cycloheptyl groups, and the like. Preferably the R group contains from one to about 18 carbon atoms. The R group can also have one or more hydrogen atoms replaced by substituents which are non-reactive with the components present in the reaction mixture. Such non-reactive substituents include, for example, fluorine, nitro, $R_2N—$,

and RO—, where R has the meaning defined hereinabove.

Primary nitro compounds containing more than one nitro group can also be used in the process of this invention. For example, the reaction of $$NO_2CH_2CH_2CH_2CH_2NO_2$$

with trichloroacetonitrile and phenyl isocyanate in benzene with trimethylamine catalyst gives the product

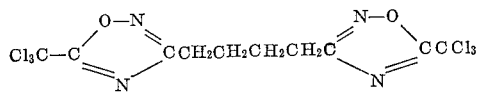

Illustrative primary nitro compound reactants are nitroethane, nitropropane, nitrodecane, nitrooctadecane, beta-phenyl-alpha-nitroethane, cyclohexylnitromethane, cumylnitromethane, phenylnitromethane, and the like. Such reactants are generally well-known and can be prepared by conventional methods such as direct nitration of hydrocarbons or the reaction of silver nitrite with a compound of the formula $RCH_2X$ wherein R has the meaning defined hereinabove and X is bromine or iodine.

The mole ratio of primary nitro compound to the nitrile compound GCN can vary from about 1:1 to about 1:10. Generally a slight excess of the nitrile GCN is used in order to avoid undesirable side reactions entered into by the nitro compound, or by intermediates derived from it, e.g., formation of furoxane.

With reference to the organic isocyanate (III) in the above equation, R' represents a monovalent hydrocarbon group free of aliphatic unsaturation, including alkyl, aryl, aralkyl, alkaryl, and cycloalkyl groups, for example, methyl, tertiary-butyl, 2-ethylhexyl, octadecyl, phenyl, phenylethyl, mesityl, cumyl, diphenl, cyclopentyl, and cycloheptyl groups, and the like. Preferably the R' group contains from one to about 18 carbon atoms. The R' group can also have one or more hydrogen atoms replaced by substituents which are non-reactive with the components present in the reaction mixture. Such non-reactive substituents include for example, fluorine, nitro, $R'_2N-$,

and R'O—, where R' has the meaning defined hereinabove. The choice of isocyanate reactant will depend primarily on cost and availability and on what by-product, R'NHCONHR' (V) is preferred. As particularly suitable for use in the process of this invention there can be mentioned methyl isocyanate, isopropyl isocyanate, decyl isocyanate, octadecyl isocyanate, cyclopentyl isocyanate, 2-methylcyclohexyl isocyanate, phenyl isocyanate, benzyl isocyanate, cumyl isocyanate, biphenyl isocyanate, and the like. Such isocyanates are well-known in the art and are either commercially available or can be prepared by conventional methods.

The ratio of isocyanate to primary nitro compound is not critical, but this ratio is preferably close to the stoichiometric ratio of 2 moles of isocyanate per mole of nitro compound.

The process of this invention can be carried out in air at atmospheric pressure, and the process is preferably carried out under anhydrous conditions.

The temperatures at which the reaction is preferably carried out are in the range from 0° C. to 150° C. and a convenient reaction temperature is often achieved by allowing spontaneous warming of the reaction mixture after the reactants are mixed together at room temperature. Where a solvent is employed, a convenient temperature is the boiling point of the solvent-reactant mixture. Temperatures above about 150° C. do not provide any advantage in rate of reaction or improvement in yield. Below 0° C. the reaction proceeds slowly and longer reaction times are required. Within the preferred temperature range, the time required for substantially complete reaction is typically from about 1 hour to about 8 hours.

A strong base catalyst is advantageously employed in the process of this invention. Suitable bases include tertiary amines for which the negative logarithm of the acid dissociation constant, pKa, is at least 5.5. A preferred class of tertiary amines are those represented by the formula $(R'')_3N$, wherein R'' is an alkyl group containing 1 to 4 carbon atoms and two R'' groups can together form an alkylene group. Suitable tertiary amine catalysts include trimethylamine, triethylamine, dimethylbutylamine, N-methylpiperidine, and the like.

The amount of catalyst is not narrowly critical and generally amounts of from 0.01 part to 10 parts by weight of base catalyst per 100 parts of nitrile GCN result in product yields of 85 percent or greater. There is no additional advantage in employing greater than 10 parts by weight catalyst per 100 parts nitrile.

Where the primary nitro compound (I) or the organic isocyanate (III) include a tertiary amine group, for example,

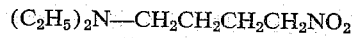

or $(CH_3)_2NC_6H_4NCO$, the use of an additional tertiary amine catalyst is not required.

The process of this invention can be carried out with or without a solvent, although a solvent is preferred. Suitable solvents include hydrocarbon solvents, both aromatic and aliphatic, such as benzene, toluene, xylene, petroleum ether, cyclohexane, 2-ethylhexane and the like, as well as the chlorinated hydrocarbons such as chlorobenzene, trichloroethane, and the like, and the etheric solvents exemplified by diethyl ether, methylbutyl ether, tetrahydrofuran, dioxane, ethylene glycol dimethyl ether, and the like.

The following examples are presented.

*Example 1*

In a 2 liter flask, 49 grams (0.55 mole) of 1-nitropropane, 119 grams (1 mole) of phenylisocyanate, 144.5 grams (1 mole) of trichloroacetonitrile were dissolved in 500 ml. of benzene. Under stirring in the course of 15 minutes, 5 ml. triethylamine in 250 ml. of benzene were added. Spontaneous warming to 50° C. occurred. Precipitation of the urea began to occur soon after the catalyst was added. After one hour stirring the mixture was heated and maintained under reflux for about two hours. After cooling to room temperature the urea was filtered off (100 grams) and the solvent and excess of the nitrile were evaporated under reduced pressure. The residue yielded on fractional distillation (at 86° C., 14 mm. Hg) 92 grams of 3-ethyl-5-trichloromethyl 1,2,4-oxadiazole (86 percent yield).

*Example 2*

Following the procedure of Example 1, 41.3 g. nitroethane, 144.5 g. trichloracetonitrile, 119 g. of phenylisocyanate and 5 ml. triethylamine were combined in benzene solvent, the reaction mixture was heated and the product recovered by fractional distillation. The yield was 100 g. of diphenylurea and 91 g. of 3-methyl-5-trichloromethyl-1,2,4-oxadiazole (91 percent yield). (B.P. 64° C. at 10 mm. Hg.)

The following table presents a summary of preparations and attempted preparations of 3,5-disubstituted-1,2,4-oxadiazoles. In Examples 1, 2, 3 and 4, the process of this invention was used. In Examples 5–17, a process similar to that of this invention was used except that in the nitrile GCN, G groups other than the trichloromethyl, p-nitrophenyl and 5-nitro-2-furyl groups of this invention were used. In the table "TEA" represents triethylamine, the "Product" has the structure

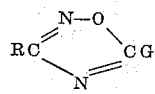

and the letter x indicates that any oxadiazole product was present in not more than trace amounts.

In Examples 3–8, the oxadiazole product had the following melting or boiling points:

Example 3—M.P. 146° C.
Example 4—M.P. 84° C.
Example 5—B.P. 70–72° C. at 12 mm. Hg.
Example 6—120° C. at 12 mm. Hg.
Example 7—M.P. 68° C.
Example 8—M.P. 102° C.

| Ex. | RCH₂NO₂ R | RCH₂NO₂ Grams | GCN G | GCN Grams | C₆H₅NCO, Grams | TEA, ml. | C₆H₆, ml. | Product Grams | Product Percent yield |
|---|---|---|---|---|---|---|---|---|---|
| 1 | CH₃— | 41.3 | CCl₃— | 144.5 | 119 | 5 | 1,000 | 91 | 91 |
| 2 | C₂H₅— | 49.5 | CCl₃— | 144.5 | 119 | 5 | 1,000 | 92 | 86 |
| 3 | CH₃— | 22.5 | p.NO₂C₆H₄— | 44.4 | 72 | 5 | 1,000 | 54 | 89 |
| 4 | CH₃— | 15 | 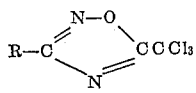 | 37.6 | 48 | 3 | 1,000 | 35 | 90 |
| 5 | CH₃— | 15 | CH₂Cl— | 15 | 47.6 | 2.5 | 500 | 10 | 40 |
| 6 | CH₃— | 37.5 | C₆H₅— | 51.5 | 119 | 10 | 1,000 | 8 | 10 |
| 7 | CH₃— | 22.5 | (2-picolyl) | 31.2 | 72 | 5 | 750 | 6.5 | 14 |
| 8 | CH₃— | 22.5 | (4-picolyl) | 31.2 | 72 | 5 | 750 | 24.5 | 51 |
| 9 | CH₃— | 37.5 | CH₃— | 20.5 | 119 | 5 | 500 | x | -------- |
| 10 | C₂H₅ | 24.9 | ClCH₂CH₂— | 47.5 | 59.5 | 2.5 | 500 | x | -------- |
| 11 | CH₃— | 19 | (C₂H₅)₂N(CH₂)₃— | 35 | 59.5 | 0 | 500 | x | -------- |
| 12 | CH₃— | 27 | CH₃OCH₂— | 26 | 45 | 15 | 550 | x | -------- |
| 13 | CH₃— | 1.5 | p.CH₃OC₆H₄— | 2.7 | 4.8 | 0.5 | 100 | x | -------- |
| 14 | CH₃— | 37.5 | CH₂=CHCH₂— | 33.5 | 119 | 5 | 400 | x | -------- |
| 15 | CH₃— | 37.5 | CH₃COO(CH₂)₂— | 56.5 | 119 | 5 | 400 | x | -------- |
| 16 | CH₃— | 7.5 | C₂H₅OCOCH₂— | 11.3 | 24 | 2 | 150 | x | -------- |
| 17 | CH₃— | 37.5 | HOCH₂CH₂— | 35.5 | 119 | 5 | 750 | x | -------- |

What is claimed is:

1. A process for producing 3,5-disubstituted-1,2,4-oxadiazoles which comprises simultaneously contacting at a temperature between about 0° C. and 150° C. (a) a primary nitro compound represented by the formula RCH₂NO₂, wherein R is a monovalent hydrocarbon group free of aliphatic unsaturation and containing from one to about 18 carbon atoms, (b) a nitrile represented by the formula GCN, wherein G is selected from the class consisting of trichloromethyl, para-nitrophenyl and 5-nitro-2-furyl groups, (c) an organic isocyanate represented by the formula R'NCO, wherein R' is a monovalent hydrocarbon group free of aliphatic unsaturation and containing from one to about 18 carbon atoms, and (d) as a catalyst a tertiary amine represented by the formula (R")₃N wherein R" is an alkyl group containing from 1 to about 4 carbon atoms and two R" groups can together form an alkylene group.

2. The process in accordance with claim 1 wherein said components (a), (b), (c) and (d) are contacted in an organic solvent.

3. A process for producing compounds represented by the formula $$R-C \underset{N}{\overset{N-O}{\diagup \diagdown}} CCCl_3$$

wherein R is a monovalent hydrocarbon group free of aliphatic unsaturation and containing from one to about 18 carbon atoms which comprises simultaneously contacting in an organic solvent at a temperature between about 0° C. and 150° C. (a) a primary nitro compound represented by the formula RCH₂NO₂, wherein R has the meaning defined herein above, (b) trichloroacetonitrile, (c) an organic isocyanate represented by the formula R'NCO, wherein R' is a monovalent hydrocarbon group free of aliphatic unsaturation and containing from one to about 18 carbon atoms, and (d) as a catalyst a tertiary amine represented by the formula (R")₃N, wherein R" is an alkyl group containing from 1 to about 4 carbon atoms and two R" groups can together form an alkylene group.

4. A process for producing 3-methyl-5-trichloromethyl-1,2,4-oxadiazole which comprises simultaneously contacting in an organic solvent at a temperature between about 0° C. and about 150° C. trichloroacetonitrile, 1-nitropropane, phenylisocyanate and triethylamine catalyst.

5. A process for producing 3-ethyl-5-trichloromethyl-1,2,4-oxadiazole which comprises simultaneously contacting in an organic solvent at a temperature between about 0° C. and 150° C. trichloroacetonitrile, nitroethane, phenylisocyanate and tirethylamine catalyst.

References Cited by the Examiner

Mukaiyama et al. J. Am. Chem. Soc., volume 82 (1960), pages 5339–5342.

HENRY R. JILES, *Acting Primary Examiner.*

R. J. GALLAGHER, *Assistant Examiner.*